Dec. 13, 1955 C. W. ROBERTS 2,727,099
APPARATUS FOR TRANSLATING SOUND WAVES INTO A SIGNAL
FOR RECEPTION BY A LIGHT SENSITIVE PART
Filed Sept. 9, 1952 2 Sheets-Sheet 2

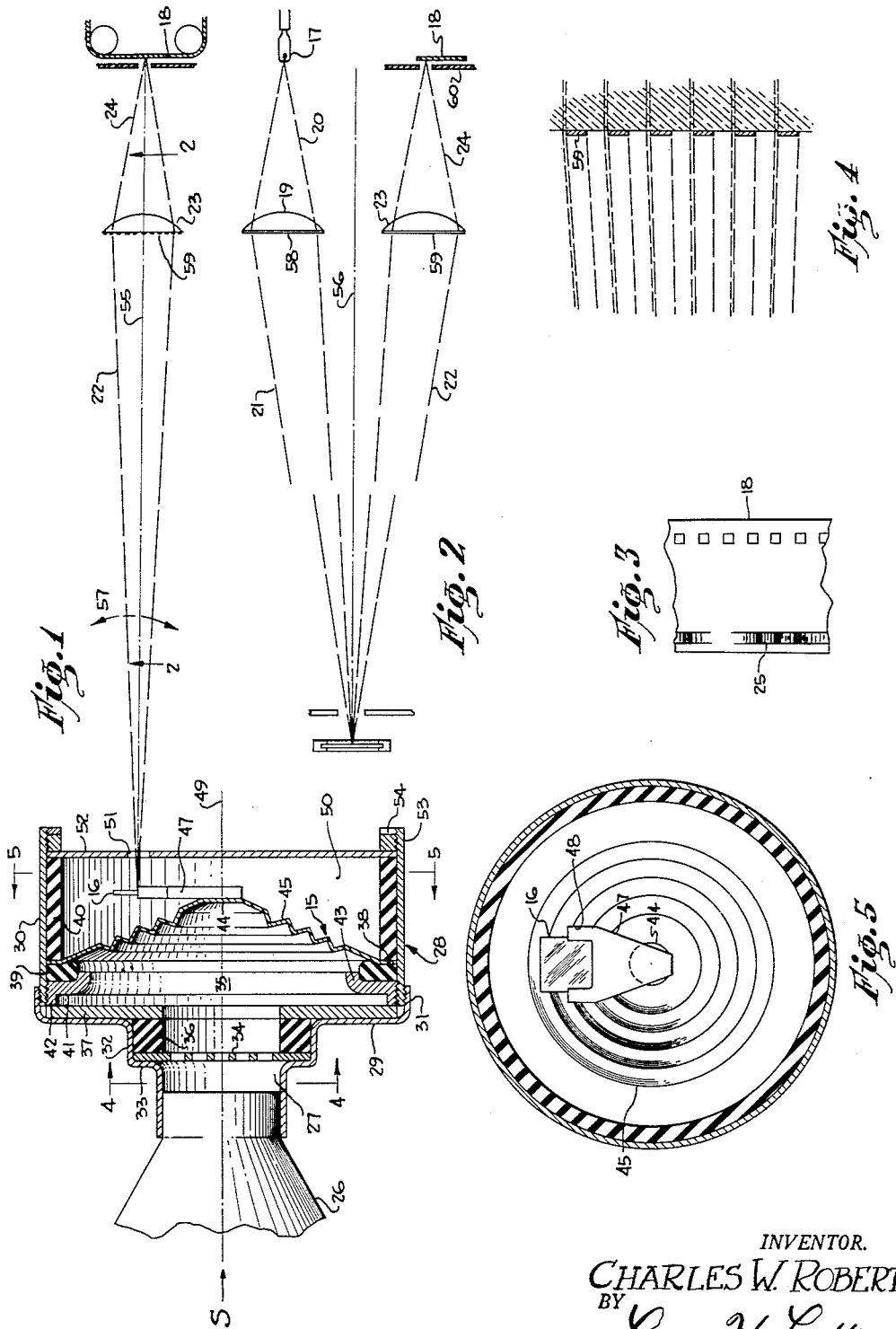

INVENTOR.
CHARLES W. ROBERTS
BY Lynn H. Latta
ATTORNEY

United States Patent Office 2,727,099
Patented Dec. 13, 1955

2,727,099

APPARATUS FOR TRANSLATING SOUND WAVES INTO A SIGNAL FOR RECEPTION BY A LIGHT SENSITIVE PART

Charles W. Roberts, Los Angeles, Calif.

Application September 9, 1952, Serial No. 308,552

9 Claims. (Cl. 179—100.3)

This invention relates to light ray vibratory apparatus. The invention is applicable to apparatus using vibrating light rays for sound recording, sound reproduction, etc. The primary object of the invention is to provide, in the operation of such apparatus, extremely efficient and high fidelity transmission of signals for sound recording, sound reproduction and like purposes.

In general, the invention utilizes an arrangement in which a light beam is vibrated by reflection from a mirror which in turn is vibrated in response to sound waves, and to utilize such vibrations to modulate a record upon a sound track or to modulate a signal transmitted to a photoelectric cell or other instrument adapted to respond to the modulated light beam, for recording, transmitting or reproducing a sound or other physical manifestation.

A further object of the invention is to provide a high fidelity vibratory system capable of transmitting or reproducing, with high fidelity, natural tones from the lowest to the highest point on the audible scale.

One of the inherent limitations of the microphone is its limited range and inability to attain sufficient volume in response to sound waves, especially those coming from substantial distances. The reproduction from a microphone is apt to be weak, varying widely between the high, low and middle registers and particularly characterized by the loss of the lighter values (the obscuring of the softer and more delicate tones by the louder notes). This has always been a major problem in sound reproduction, owing to the differences in vibration frequencies and amplitudes in the low and high registers, as compared to the relatively unchanging characteristics of the mechanism responding to the vibrations.

Another object of my invention is to provide a simplified apparatus for recording and transmitting sounds, using a vibratory light beam. Specifically, the invention contemplates the direct transmission to a reflecting mirror, of the vibrations of a diaphragm responding directly to sound waves. One of the principles employed by my invention in achieving high fidelity and wide range reproduction is the direct mechanical transmission of vibrations from the sound wave responsive diaphragm to the mirror, eliminating intervening electrical pick-up and reproducing mechanism and all distortions that may arise in such stage of reproduction.

Merely utilizing the principle of direct transmission of vibrations from the sound wave responsive diaphragm to the mirror, does not in itself solve all of the problems involved in attaining high fidelity and wide range reproduction. After years of attempts to utilize this principle to the best advantage, I have discovered that a number of additional factors are essential to the full realization of the objects aimed at. One of these factors is the utilization of adequate means for damping any tendency toward resonant vibration of the diaphragm, while promoting the characteristic of sensitive response to vibration throughout a full range of tone reproduction. Resonance in the diaphragm is undesirable because of its distorting effect.

I have discovered that a high degree of sensitivity of response, combined with a high degree of damping, may be obtained by utilizing a diaphragm having a relatively hard, tempered central portion or apex, providing a base for mounting an eccentrically disposed mirror through the medium of an amplitude multiplying arm; with the annular body portion of the diaphragm surrounding said apex portion being of minimum resonance and with the rim of the diaphragm mounted in vibration suppressing material.

I have further discovered that one of the difficulties inherent in earlier attempts to utilize the principle of reflection of a light beam, has been the inability to attain sufficient volume of change in the light beam in response to the sound wave effect. In the present invention, there is incorporated an additional factor for promoting high fidelity reproduction, namely, the inclusion, in the range of modulation of the cross-sectional area of the light beam, all values from the minimum clear down to zero, in contrast to the common method of maintaining the cross-sectional area of the light beam at a substantial value at its minimum. I find that there are a number of important advantages in modulating the light beam from a zero value instead of from a minimum of substantial value. One of these advantages is the elimination of background noise. A continuing light track on the film, even though it is not modulated by sound picked up by the recording mechanism, will invariably produce a soft hissing sound in the reproduction. My invention aims to eliminate this background noise to a large extent. Modulating the light beam down to a zero minimum value has proven to be a means of doing so.

Another advantage of this feature of the invention is that it makes possible a greater ratio of change in the cross-sectional area of the light beam, other factors being equal. This will become apparent when it is considered that a given amount of change, e. g., downwardly from two to one gives a ratio of two, whereas an equal amount of change from 1.1 down to .1 (approaching zero) gives a ratio of 10 or five times as great.

Accordingly, it is one of the objects of my invention to provide a recording mechanism that will modulate the light beam from maximum value down to the zero minimum value, completely cutting off the light beam and eliminating any track on the film when no sound is being recorded, and attaining maximum ratio of change. It is a further object to provide for modulating the light beam so as to attain not only maximum ratio but maximum amplitude of change.

In this aspect of the invention, it provides a light valve mechanism embodying a pair of slotted grids, each having, not one, but a plurality of light transmitting apertures, whereby the change in the cross-sectional area of the light beam produced by a very slight shift of a section of the light beam passing through one pair of apertures in the respective grids is multiplied by the total number of pairs of apertures. In order to attain this result, the apertures are not only multiplied but are arranged so that all pairs of apertures have the same effect upon the total light beam (act in unison in either reducing or increasing the cross-sectional area of the light beam).

Furthermore, the invention embodies the realization that the mere observance of the principle of modulating the light beam down to zero minimum value does not in itself solve all problems of high fidelity and wide range reproduction in this type of apparatus and can, as a matter of fact, be easily misused so as to defeat the object of the invention. The principle can be successfully employed only by observance of the additional requirement that the grid be so adjusted that in diminishing the cross-sectional area of the light beam in response to diminishing sound, the zero value of the light beam should be arrived at substantially coincidentally with the arrival of the zero value in the sound beam recorded (i. e., the arrival of the sound value at the inaudible stage with reference to the average human ear). In attempting to obtain the characteristics of modulating the light beam down to zero value, a natural inclination is to provide for overclosing the valve to make sure that no stray light rays will pass therethrough in its closed position. This will result in eliminating the fainter notes from the reproduction and detracting from the sought after high fidelity. Accordingly, a further object of the invention is to provide a recording mechanism in which the light valve may be adjusted so as to completely close, but not to overclose, and so as to open in response to tones in the lower range of audibility.

Another essential requirement of the light valve mechanism is that the narrow, elongated apertures of the shutter or grid mechanism be maintained in exact parallelism so that the point of complete closing of the aperture may be the same throughout the entire length of the aperture.

These characteristics and requirements of the light valve mechanism may be realized in a pair of shutter grids, one of which interrupts the light beam on its way to the mirror and the other of which interrupts the light beam as it is reflected back from the mirror; and by providing means for mounting these grids for parallel movements in paths at right angles to the length of their grids, together with relatively simple means for simultaneously adjusting the two grids in opposite directions in order to adjust the point of aperture closing to substantially coincide with the minimum limit of the range of audibility in the sound which operates the diaphragm.

A still further characteristic of the invention is the utilization of means for shielding the vibrating mirror from all light rays except the operating light beam, in order to eliminate the effect of extraneous rays of light from sources other than the light beam, which, if reflected from the mirror, would tend to obscure the sharpness of the signal transmitted by the operative light beam.

In its overall aspects, my invention involves the discovery that the combination of the several features above outlined will provide extremely efficient and high fidelity recording and reproduction of sound waves.

Other objects and characteristics of the invention will become apparent in the following specification in connection with the attendant drawings, in which:

Fig. 1 is a schematic view of a sound recording apparatus embodying my invention, with the diaphragm unit shown in axial section;

Fig. 2 is a schematic view of the same, taken on the line 2—2 of Fig. 1;

Fig. 3 is a face view of section of film having a sound track produced by the invention;

Fig. 4 is an enlarged sectional view through a portion of the second stage grid and condenser lens, illustrating the shutter effect of this second stage grid on the light beam as modified by the primary stage grid;

Fig. 5 is a detail transverse sectional view on the line 5—5 of Fig. 1, showing a face view of the mirror and diaphragm;

Figure 6:
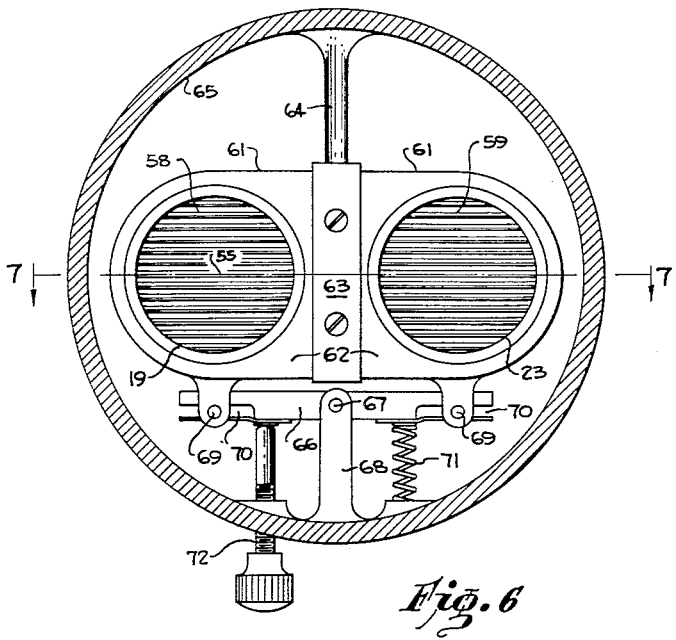
Fig. 6 is a detail sectional view of the assembly of lens-grid elements and their adjustable mounting mechanism.

As an example of one form in which the invention may be embodied, I have shown in Fig. 1 an apparatus for recording sound on film. Sound waves, coming from a source indicated by the reference character S, are concentrated upon a diaphragm 15 on which is mounted a mirror 16. A light beam 20 originating at a light source such as the filament 17, is reflected by mirror 16 onto the recording film 18 to photographically produce a sound track. In passing from the source 17 back to the recording film 18, the light beam 20 passes first through a focusing lens 19, which functions to focus it at 21 upon the mirror 16, the reflected beam 22 then passing through a condenser lens 23 which focuses it, at 24, upon the recording film 18. The lenses 19 and 23 each form a portion of a combined lens and grid unit of which the two grids cooperate to constitute a light valve or shutter for modulating the light beam by increasing and decreasing its intensity in one dimension (in a direction transverse to the path of movement of the film 18). The resulting sound track is a line of varying thickness and intensity as indicated generally at 25 in Fig. 3.

Proceeding now to the detailed and structural aspects of the invention, I will first describe the sound wave responsive unit.

*The sound wave responsive unit*

Referring now to Figs. 1–4 inclusive, the improved pick-up or sound wave responsive unit of my invention includes a directional collecting horn 26 for collecting the sound waves from source S and delivering them in concentrated form into the receiving mouth 27 of a diaphragm casing which is indicated generally at 28. Mouth 27 forms an integral part of a cap 29 which is demountably attached to the cylindrical body portion 30 of casing 28, as by means of a flange 31 on cap 29, threaded onto one end of casing body 30. Cap 29 embodies, intermediate the receiving mouth 27 and flange 31, and annular recess portion 32 of somewhat larger diameter than mouth portion 27, providing a shoulder 33 against which is mounted the peripheral portion of an apertured disc 34 which functions as a blast-inhibiting screen to dampen the effect of the higher intensity sound waves as they enter the tone chamber 35 of the pick-up unit. Screen 34 has a vibration dampening mounting comprising an annular cushion 36 received within the recess portion 32 of cap 29 and confined therein between screen 34 and a retainer washer 37. Washer 37 has a central aperture to provide a continuation of the sound wave passage beginning with mouth 27, extending through screen 34 and through annular cushion 36.

The tone chamber 35 is defined between screen 34 and diaphragm 15. Diaphragm 15 has a flat peripheral portion 38 which has a vibration dampening mounting comprising an annular ring 39 of a fairly hard and form retaining material, though not highly resonant. Such material may be hard rubber or hard fiber (e. g. thermosetting synthetic resin plastic material such as phenol-formaldehyde or a comparable resin) or any other material of comparable characteristics of hardness form retention, yet moderate resonance. The other member of the vibration damping mounting for diaphragm 15 comprises a sleeve 40 of relatively soft yet firm material such as tread rubber, having a high degree of vibration damping characteristic and substantially no resonance within the range of audible sound frequencies.

Mounting ring 39 is seated against a rigid washer 41 (preferably of metal) having an externally threaded rim portion 42 which is threaded into an internal thread in casing body 30, and having an axially extending flange 43 which projects partially into mounting ring 39 and supports its inner face.

Diaphragm 15 has a central apex or crown portion 44 which is tempered to a high degree of hardness and rigidity, to provide a firm mounting for mirror 16. Intermediate the crown 44 and rim 38, diaphragm 15 has an annularly corrugated body portion 45 which is of dead soft material such as pure soft, unhardened aluminum, or other material of equivalent softness.

Firmly secured to crown 44 in any suitable manner as by welding or riveting is a mirror mounting arm 47. The outer end of arm 47 is formed or provided with a suitable mirror mounting, such as for example the bifurcated portion 48 having a groove to receive the edge of mirror 16. The mirror is firmly secured in the groove in any suitable manner, as by cementing.

Crown 44 is parallel to the plane of rim 38, both being disposed in planes normal to the major axis 49 of the pick-up unit. Arm 47 is disposed at right angles to axis 49 and the plane of mirror 16 is likewise normal to axis 49.

The respective portions 21 and 22 of the light beam enter and leave the mirror chamber 50 of the pick-up unit through a relatively small aperture 51 in an end plate 52 which is mounted within casing body 30 between mounting sleeve 40 and a tuning ring 53, the latter being adjustably mounted in the rear end of casing body 30 as by being threaded therein as indicated. Tuning ring 53 is provided with suitable wrenching notches 54 for cooperation with a wrench for rotating the ring to advance the same or back it off with relation to the diaphragm 15, thus varying the compression in mounting ring 40 and correspondingly varying its vibration damping effect.

At this point it may be noted that the axes of light beam sections 21, 22, are normally disposed in a common plane (indicated by the broken line 55 of Fig. 1) parallel to the major axis 49 of the pick-up unit but at right angles to the radial axis of arm 47. Thus the plan 56 (Fig. 2) which is determined by the radial axis of arm 47 and the major axis 49 is disposed at right angles to the common plane 55 of beams 21, 22 and bisects the angle between these beams.

The mirror will vibrate with a maximum amplitude of movement in the plane 56 and a minimum amplitude of movement in plane 55. The major component of vibration is indicated by the curved arrow 57 in Fig. 1. The film 18 is arranged to move in a path parallel to the plane 56, whereby the modulation of the light beam will be effective in a direction lengthwise of the film, thus producing the light track 25 when photographed through a narrow optical slit in a light shield 60. It may now be noted that the major bending of the light rays takes place at right angles to the common median plane 55 of the two sections 21, 22 of the beam, whereby the reflected section 22 is shifted above and below the median plane 55 during sound transmission.

*The light valve unit*

Referring now to Figs. 3–8, the lenses 19, 23 are faced with parallel bars of opaque material, laterally spaced to form grids 58, 59. The bars 58 may be formed in any suitable manner as by coating the flat faces of lenses 19—23 with a fully opaque coating and then scribing lines in the coating to remove the coating and provide apertures between the grid bars. The bars of the respective grids are parallel and are arranged normally in non-registering relation such that the several flat parallel beam sections of light comprising the beam 21, as reflected back to lens 23, will normally be completely intercepted by the bars of grid 59. Thus the beam is normally arrested at grid 59 and is permitted to pass therethrough only when the mirror is moved as a result of vibration of diaphragm 16. When thus permitted to pass through the grid 59, the beam 24 is comprised of a plurality of thin ribbon-like shafts of light varying in thickness in accordance with the displacement of the mirror 16. The beam 24 is focused through the optical slit in the light shield 60 which is located directly in front of the film 18, within the camera in which film 18 is exposed. This slit provides for the characteristic barred appearance of sound track 25.

Since the beam 22 is completely arrested at the grid 59 when the mirror 16 is at rest, the sound track will be completely interrupted when no sound is striking the diaphragm 14. Consequently, the background noise commonly heard in sound on film reproduction will be eliminated in the use of my apparatus, as indicated by the interruption of sound track 25 in Fig. 3.

The bars of grids 58, 59 are so proportioned and adjusted that the slightest shifting of the beam 22 to one side or the other will result in the passing of some light through the grid 59. It is of course apparent that it would be possible to have the bars in the grid 59 so proportioned as to project beyond the thickness of the shafts of light intercepted by these bars when the mirror is at rest, and in such a case the grid 59 would not start to pass light until an initial range of shifting movement of the beam 22 had taken place. This I consider to be undesirable and therefore have arranged for the ribbons of light in the beam 22 to be just barely cut off when the mirror is at rest, whereby the slightest mirror movement will result in passing light to the film 18. This result may be achieved by utilizing bars that are substantially equal in width to the width of the apertures therebetween.

The bars and apertures are fairly narrow in width. In this connection it will be understood that the width of the bars and apertures is exaggerated in Fig. 3 and that actually the bars and apertures may be narrower in proportion to the diameter of the lens. Thus it becomes possible for the shifting light beam 22 to reach a position of full width registry of its individual beam sections with the apertures of grid 59, to provide maximum light transmission. The width of the bars and apertures is determined by the characteristics of the pick-up unit, i. e. the maximum bending that the mirror 16 will produce upon the light beam in response to tones at the upper limit of magnitude. In this connection, it will be understood that the vibration damping characteristics imparted to the pick-up unit by the dead soft diaphragm 15 and the cushioning mountings 39, 40, is such as to establish a definite upper limit upon the amplitude of swing of mirror 16.

By arranging the bars of grids 58, 59, in parallel relation, it becomes possible to provide for adjustment of the registration of the grids. This is provided for by the adjustable mounting and adjustment means shown in Figs. 6 and 7. The lenses 19, 23 are mounted in suitable lens frames 61, each having at one side a straight flat shoe 62, roughly tangent to the lens and disposed in a plane at right angles to the plane of the lens. Shoes 62 are snugly mounted for sliding movement in ways comprising channels 63 secured to a supporting rib 64. Rib 64 forms a part of or is secured to a frame 65 which may form part of a light casing of which shield 60 may also form a part. Supporting rib 64 is disposed in the median plane 56, whereby the lenses 19, 23 are supported in symmetrical relation thereto, in a common plane normal thereto.

Lenses 19, 23 are adjusted by sliding them in opposite directions in the ways 63, 64. This is accomplished by connecting the lens frames 61 through a walking beam 66 pivoted at 67 on a bracket 68 carried by the casing or light hood 65. Suitable extensions of lens frames 61, having fingers 69 projecting into slots 70 in walking beam 66, transmit the movement of walking beam 66 through the lens frames. A coil spring 71 urges walking beam 66 to tilt in one direction. An adjusting screw 72, threaded through a boss in casing member 65, engages walking beam 66 to tilt it in the opposite direction, against the compression of spring 71. Thus the position of tilt of beam 66 depends upon the position of adjustment of screw 72.

Through the use of the adjustable mounting of the lenses, it becomes possible to adjust the grids in directions transverse to their apertures, whereby to adjust the registration of the grids. Thus the grids may be registered in such a manner as to have the light valve barely closed when the mirror is at rest, and subject to immediate opening under the influence of any sound at the lower limit of audibility.

*Modification*

Figure 9:
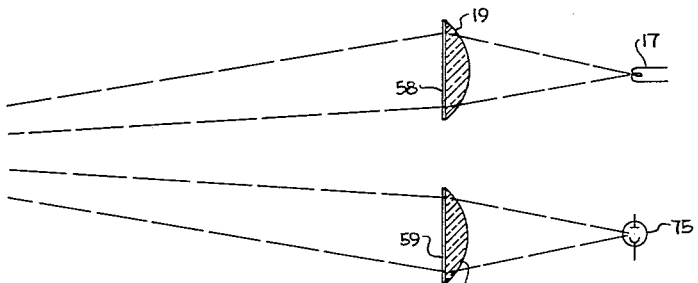
Fig. 9 is a diagram illustrating the application of the invention to a modified arrangement in which the modulated light beam is received by a photoelectric cell instead of a photographic film.

The arrangement shown in Figs. 1 and 2 is used in recording of sound on film. It will be understood that the invention is equally adaptable to the transmission of sound wave responsive signals to a light responsive electrical element such as a photoelectrical cell, for conversion into an electrical signal which can be fed into a radio broadcast transmitting system or into a simple amplifying system for a loud speaker. The adaptation of the invention to such a system is indicated in Fig. 9, where the modulated light beam impinges upon a photoelectric cell 75. The remainder of the apparatus for sound wave modulation of a light beam, may be the same as in Figs. 1–7.

Figure 8:
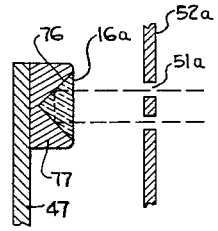
Fig. 8 is a detail sectional view of a modified form of the mirror and associated pacing part with light apertures.
Figure 7:
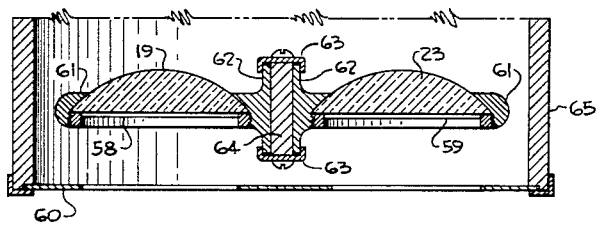
Fig. 7 is a transverse sectional view taken on the line 7—7 of Fig. 6.

As shown in Fig. 8, the mirror 16a may be in the form of a prism having two back reflecting faces 76, mounted in a suitable mounting 77 on arm 47, and adapted to reflect the beam with the two sections thereof either in diverging or parallel relationship as desired. In this instance, dual apertures 51a in light shield member 52a, may be employed.

I claim:

1. Apparatus for translating sound waves into a signal for reception by a light sensitive part such as film, light sensitive instruments or the like, comprising: a diaphragm of dead soft aluminum foil between .001 and .0025 inch thickness, a mirror connected to said diaphragm to be oscillated thereby, means for focusing an original beam of light upon said mirror to produce a reflected beam spaced laterally from said original beam, means for focusing the reflected beam upon a light sensitive element, and a light valve comprising a pair of grids interposed in the respective beams with the first grid arranged to intercept spaced parallel sections of the original beam and the second grid arranged to intercept the spaced shafts of light passed by the first grid to an extent depending upon the amplitude of the vibration of the mirror.

2. Apparatus for translating sound waves into a signal for reception by a light sensitive part such as film, light sensitive instruments or the like, comprising: a conical diaphragm of dead soft aluminum foil having a hard tempered apex, means for collecting and directing sound waves upon said diaphragm, a perforated blast-inhibiting disc interposed between said collecting means and said diaphragm, an arm rigidly secured to said apex and extending radially, a mirror mounted on the free end of said arm so as to be vibrated by the diaphragm with amplitude multiplication through said arm, focusing the reflected beam upon a light-sensitive element, and a light valve comprising a pair of grids interposed in the respective beams, the first grid being arranged to break up the original beam into a plurality of thin shafts of light, spaced apart, and the second grid being adapted to completely intercept said thin shafts of light when the mirror is at rest and to pass portions thereof to an extent proportionate to the amplitude of the vibration of the mirror.

3. Apparatus for translating sound waves into a signal for reception by a light sensitive part such as film, light sensitive instruments or the like comprising: a light source, an ultra-sensitive diaphragm of a metal of extreme softness and low elasticity, said diaphragm being conical, having a rim flange, and having flat apex, parallel to said rim flange, said apex being of a hard, tempered metal, an arm rigidly mounted on said apex and projecting radially therefrom in diverging relation to the conical body of the diaphragm, a mirror mounted on the outer end of said arm, for receiving from the diaphragm, vibrations that are amplified by said arm in the common plane of the arm and the major axis of the diaphragm; and a light valve comprising a pair of grids, each having a series of parallel, narrow slot-like apertures therein, disposed on opposite sides of said plane with the apertures of respective grids extending parallel to each other and at right angles to said plane, a mirror carried by and vibrating with said diaphragm, means for focusing an original light beam from said source upon said mirror to produce a reflected light beam spaced from said original light beam, and means for focusing the reflected beam upon a light-sensitive element.

4. Apparatus for translating sound waves into a signal for reception by a light sensitive part such as film, light sensitive instruments or the like, comprising a light source, an ultra-sensitive diaphragm of a metal of extreme softness and low elasticity, said diaphragm being conical, having a rim flange, and having flat apex, parallel to said rim flange, said apex being of a hard, tempered metal, an arm rigidly mounted on said apex and projecting radially therefrom in diverging relation to the conical body of the diaphragm, a mirror mounted on the outer end of said arm, for receiving from the diaphragm, vibrations that are amplified by said arm in the common plane of the arm and the major axis of the diaphragm; and a light valve comprising a pair of grids, each having a series of parallel, narrow slot-like apertures therein, disposed on opposite sides for variably transmitting said beam to said reception part with intensity proportional to the amplitube of vibration of said mirror.

5. Apparatus as defined in claim 4 including a casing for said diaphragm, and vibration damping mounting means in said casing, comprising an annular seat engaging one side of said flange and a sleeve of soft, compressible material having generally the characteristics of tread rubber, engaged against the other side of said flange and telescoped within said casing.

6. Apparatus as defined in claim 5, including an adjusting ring threaded into said casing and adapted to place said sleeve variably under pressure, for adjusting the degree of vibration damping.

7. Apparatus as defined in claim 4, including a light shielding casing enclosing said mirror, said casing having a restricted aperture for passage of said light beam to and from said mirror.

8. Apparatus for translating sound waves into a signal for reception by a light sensitive part such as film, light sensitive instruments or the like, comprising: a diaphragm sensitive to sound waves, a mirror carried by said diaphragm so as to be oscillated by the vibrations of the diaphragm, means for focusing a beam of light on said mirror for reflection therefrom, a grid interposed in the path of said light beam so as to break the same up into a plurality of light shafts which, in cross section, are parallel and spaced apart, a second grid interposed in the path of the reflected beam, said second grid being of such conformation and positioning as to intercept the shafts of the reflected beam when the diaphragm is at rest, and to pass portions of the reflected light shafts to an extent depending upon the amplitude of the vibration of the diaphragm, a pair of mounting frames for said grids, slideways in which said mounting frames are slidably mounted for movement parallel to said plane, means for shifting said grids in opposite directions to vary the registration of said apertures, and means for focusing the beam composed of said passed portions of the light shafts upon a light-sensitive receiving element.

9. Apparatus as defined in claim 5, including an adjusting ring threaded into said casing and adapted to place said sleeve variably under pressure, for adjusting the degree of vibration damping, said last means comprising a walking beam to which the respective grid frames are connected, a support on which said beam is pivoted, an adjusting screw engaging said beam at one side of its pivot, and a spring acting against said beam to yieldingly maintain it in engagement with said screw.

References Cited in the file of this patent

UNITED STATES PATENTS

| | | |
|---|---|---|
| 1,291,702 | Adsit | Jan. 21, 1919 |
| 1,879,423 | Neale | Sept. 27, 1932 |